(12) United States Patent
Nakahara

(10) Patent No.: US 12,259,534 B2
(45) Date of Patent: Mar. 25, 2025

(54) ZOOM LENS AND OPTICAL APPARATUS

(71) Applicant: CANON KABUSHIKI KAISHA, Tokyo (JP)

(72) Inventor: Makoto Nakahara, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 573 days.

(21) Appl. No.: 16/931,022

(22) Filed: Jul. 16, 2020

(65) Prior Publication Data

US 2021/0033835 A1 Feb. 4, 2021

(30) Foreign Application Priority Data

Jul. 29, 2019 (JP) .................. 2019-138892

(51) Int. Cl.
*G02B 15/20* (2006.01)
*G02B 13/00* (2006.01)
(Continued)

(52) U.S. Cl.
CPC ......... *G02B 15/177* (2013.01); *G02B 13/009* (2013.01); *G02B 13/02* (2013.01);
(Continued)

(58) Field of Classification Search
CPC ...... G02B 13/02; G02B 13/009; G02B 15/20; G02B 15/177; G02B 27/0025; G02B 15/1461; H04N 5/23296; G03B 5/00
See application file for complete search history.

(56) References Cited

U.S. PATENT DOCUMENTS 5,137,850 A * 8/1992 Clement ................. C03C 3/155
   501/901
6,014,267 A * 1/2000 Tsurutani ............... G02B 13/16
   359/689

(Continued)

FOREIGN PATENT DOCUMENTS

JP 2010-204178 A 9/2010
JP 2012-047814 A 3/2012
(Continued)

OTHER PUBLICATIONS

H.T. Betz, Measurement of Luminescence by the Fraunhoffer Line Depth Method, Technical Letter NASA-70 (1966). (Year: 1966).*
(Continued)

*Primary Examiner* — Cara E Rakowski
*Assistant Examiner* — Wesley Scott Ashton
(74) *Attorney, Agent, or Firm* — Carter, DeLuca & Farrell LLP

(57) ABSTRACT

A zoom lens includes, in order from an object side to an image side, a first lens unit having a positive refractive power, a second lens unit having a negative refractive power, and a rear unit including a plurality of lens units. During zooming, a distance between adjacent lens units of the first, second and plurality of lens units changes. The rear unit includes an aperture stop and a negative lens unit disposed closest to an object among at least one lens unit having a negative refractive power on the image side of the aperture stop. The negative lens unit includes a positive lens. A predetermined conditions are satisfied.

22 Claims, 11 Drawing Sheets

(51) Int. Cl.
G02B 13/02 (2006.01)
G02B 15/177 (2006.01)
G02B 27/00 (2006.01)
H04N 23/69 (2023.01)

(52) U.S. Cl.
CPC ......... *G02B 15/20* (2013.01); *G02B 27/0025* (2013.01); *H04N 23/69* (2023.01)

(56) References Cited

U.S. PATENT DOCUMENTS

| | | | | |
|---|---|---|---|---|
| 7,630,141 | B2* | 12/2009 | Saruwatari | G02B 15/145121 |
| | | | | 359/686 |
| 8,203,793 | B2* | 6/2012 | Wada | G02B 13/04 |
| | | | | 359/683 |
| 9,172,882 | B2* | 10/2015 | Uchida | H04N 5/23296 |
| 9,219,864 | B2 | 12/2015 | Nakahara | |
| 9,377,606 | B2 | 6/2016 | Nakahara | |
| 9,465,203 | B2* | 10/2016 | Sugita | G02B 15/1461 |
| 9,488,800 | B2* | 11/2016 | Suzuki | G02B 27/0062 |
| 9,500,842 | B2 | 11/2016 | Nakahara | |
| 10,268,104 | B2 | 4/2019 | Nakahara | |
| 10,345,560 | B2* | 7/2019 | Nishi | G02B 27/646 |
| 10,718,929 | B2 | 7/2020 | Saito et al. | |
| 11,143,852 | B2* | 10/2021 | Yamanaka | G02B 13/009 |
| 11,327,281 | B2* | 5/2022 | Kimura | G02B 15/20 |
| 2007/0201147 | A1* | 8/2007 | Yokoyama | G02B 7/008 |
| | | | | 359/691 |
| 2009/0273845 | A1* | 11/2009 | Maetaki | G02B 7/008 |
| | | | | 359/676 |
| 2011/0141573 | A1* | 6/2011 | Eguchi | G02B 15/10 |
| | | | | 359/675 |
| 2013/0201370 | A1* | 8/2013 | Hatada | G02B 15/143105 |
| | | | | 359/683 |
| 2015/0015966 | A1* | 1/2015 | Ida | G02B 15/177 |
| | | | | 359/683 |
| 2018/0039051 | A1* | 2/2018 | Kimura | G02B 15/1461 |
| 2019/0041605 | A1 | 2/2019 | Saito et al. | |
| 2019/0162940 | A1 | 5/2019 | Nakahara | |
| 2019/0196160 | A1* | 6/2019 | Ikegaya | G02B 15/1451 |
| 2019/0302404 | A1* | 10/2019 | Iwamoto | G02B 15/1461 |
| 2020/0264413 | A1* | 8/2020 | Yamanaka | G02B 13/18 |

FOREIGN PATENT DOCUMENTS

| | | |
|---|---|---|
| JP | 2012-078788 A | 4/2012 |
| JP | 2015102619 A | 6/2015 |
| JP | 2015-145914 A | 8/2015 |
| JP | 2019-008012 A | 1/2019 |
| JP | 2020-154288 A | 9/2020 |
| WO | 2015/075943 A1 | 5/2015 |

OTHER PUBLICATIONS

Adolf W. Lohmann, Scaling Laws for Lens Systems, 28 Applied Optics 4996-4998 (1989). (Year: 1989).*
Sophie Morel, Methods for Measuring a Lens Focal Length [Online]. Dec. 2011 [retrieved on Jul. 18, 2022]. Retrieved from Internet: <URL: https://wp.optics.arizona.edu/optomech/wp-content/uploads/sites/53/2016/10/Tutorial_MorelSophie.pdf>. (Year: 2011).*
Abbe Number and Longitudinal Chromatic Aberration (LCA) [Online]. Apr. 24, 2018 [retrieved on Jul. 13, 2022]. Retrieved from Internet: <URL: https://bauschsurgical.eu/blog-learning/blog/abbe-number-and-longitudinal-chromatic-aberration-lca/>, (Year: 2018).*
Antonin Mikš et al., Determination of the Refractive Index and Abbe Number of Glass of Spherical Lenses, 57 Applied Optics 4728-4734 (Jun. 4, 2018). (Year: 2018).*
The American Heritage Dictionary 510 (1981). (Year: 1981).*
Lens Materials, 2010, pp. 1-7 [online], [retrieved May 25, 2023], retrieved from the Internet <URL: https://www.laramyk.com/resources/education/lens-options-and materials/lens-materials/>. (Year: 2010).*
Iain A. Neil, High Performance Zoom Lenses with a Forward Located Stop, 8488 Proceedings of SPIE 84880L-1 to 84880L-13 (2012). (Year: 2012).*
Simon Thibault et al., Consumer Electronic Optics: How Small a Lens Can Be? The Case of Panomorph Lenses, 9192 Proceedings of SPIE 91920H-1 to 91920-7 (2014). (Year: 2014).*
Libin Sun et al., Lens Factory: Automatic Lens Generation Using Off-the-shelf Components, 2015, pp. 1-12 [online], [retrieved Aug. 22, 2023], retrieved from the Internet <URL: https://arxiv.org/pdf/1506.08956.pdf>. (Year: 2015).*
C. Bond, Lensmaker's Formula, 2017, pp. 1-3 [online], [retrieved Jun. 28, 2023], retrieved from the Internet <URL: https://crbond.com/papers/lensmaker.pdf>. (Year: 2017).*
Andy Rowlands, Physics of Digital Photography, Chapter 1, 2017, pp. 1-1 to 1-62 [online], [retrieved Nov. 2, 2023], retrieved from the Internet <URL: https://iopscience.iop.org/book/mono/978-0-7503-1242-4/chapter/bk978-0-7503-1242-4ch1.pdf>. (Year: 2017).*
Machine English Translation of JP 2012-078788 A, with copy of JP 2010-078788 A. (Year: 2023).*
5 Considerations for the Mechanical Design, Assembly and Alignment of Optical Systems, 2016, pp. 1-7 [online], [retrieved Oct. 30, 2023], retrieved from the Internet <URL: https://www.laserfocusworld.com/sponsored/edmund-optics/article/16571942/5-considerations...-optical-systems>. (Year: 2016).*
Bill Hill, Concepts in Light and Optics—Lenses—Part 2, 2017, pp. 1-14 [online], [retrieved Sep. 5, 2024], retrieved from the Internet <URL: https://escooptics.com/blogs/news/concepts-in-light-and-optics-lenses-part-2>. (Year: 2017).*
Sung Chan Park et al., Zoom Lens Design Using Lens Modules, 35 Optical Engineering 1668-1676 (1996). (Year: 1996).*
Ellis Betensky, Forty Years of Modern Zoom Lens Design, 5865 Proceedings of Spie 586506-1 to 586506-8 (2005). (Year: 2005).*
Notice of Reasons for Rejection issued by the Japanese Patent Office on May 16, 2023 in corresponding JP Patent Application No. 2019-138892, with English translation.
Notice of Reasons for Rejection issued by the Japanese Patent Office on Aug. 22, 2023 in corresponding JP Patent Application No. 2019-138892, with English translation.

* cited by examiner

ZOOM LENS AND OPTICAL APPARATUS

BACKGROUND OF THE INVENTION

Field of the Invention

The present invention relates to an optical system suitable for an optical apparatus including an image pickup apparatus, such as a digital still camera, a digital video camera, a broadcasting camera, a surveillance camera, and a film-based camera, and an interchangeable lens.

Description of the Related Art

One of the above zoom lenses is a positive lead type in which a lens unit having a positive refractive power is disposed closest to the object. Japanese Patent Laid-Open No. ("JP") 2015-102619 discloses, as a positive lead type zoom lens, a zoom lens that includes, in order from an object side to an image side, a first lens unit having a positive refractive power, a second lens unit having a negative refractive power, and a rear unit including a plurality of lens units. In general, a positive lead type zoom lens is likely to make compact the overall system and to achieve a high zoom ratio.

However, in the positive lead type zoom lens, if a focal length at the telephoto end is made long, longitudinal and lateral chromatic aberrations increase. In order to reduce these chromatic aberrations, it is important to properly set characteristics (such as an Abbe number and a partial dispersion ratio) of a material of each lens unit that constitutes the zoom lens.

SUMMARY OF THE INVENTION

The present invention provides a zoom lens that has reduced longitudinal and lateral chromatic aberrations.

A zoom lens according to one aspect of the present invention includes, in order from an object side to an image side, a first lens unit having a positive refractive power, a second lens unit having a negative refractive power, and a rear unit including a plurality of lens units. During zooming, a distance between adjacent lens units of the first, second and plurality of lens units changes. The rear unit includes an aperture stop and a negative lens unit disposed closest to an object among at least one lens unit having a negative refractive power on the image side of the aperture stop. The negative lens unit includes a positive lens. The following conditions are satisfied:

$$0.1000 < \theta gFp - (-1.665 \times 10^{-7} \times vdp^3 + 5.213 \times 10^{-5} \times vdp^2 - 5.656 \times 10^{-3} \times vdp + 0.7268) < -0.0001$$

$$25 < vdp < 50$$

$$0.10 < Dwp/Dtp < 0.70$$

where $vdp$ is an Abbe number of the positive lens for the d-line, $\theta gFp$ is a partial dispersion ratio of the positive lens for the g-line and the F-line, $Dwp$ is a distance on an optical axis from the aperture stop at a wide-angle end to a vertex of the positive lens on the object side, and $Dtp$ is a distance on the optical axis from the aperture stop at a telephoto end to the vertex of the positive lens on the object side.

An optical apparatus having the above zoom lens serving as the optical system also constitutes another aspect of the present invention.

Further features of the present invention will become apparent from the following description of exemplary embodiments with reference to the attached drawings.

DESCRIPTION OF THE EMBODIMENTS

Figure 1:
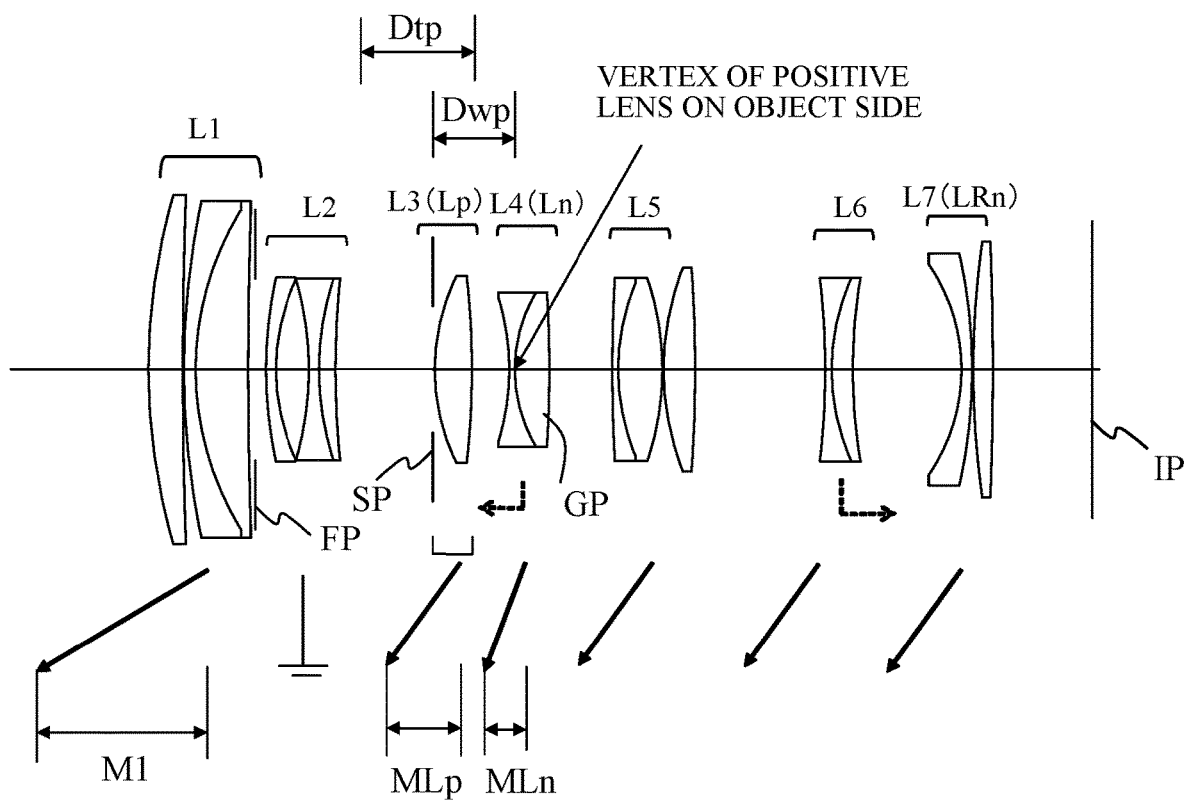
FIG. 1 is a sectional view of a zoom lens according to Example 1 of the present invention at a wide-angle end.
Figure 2A:
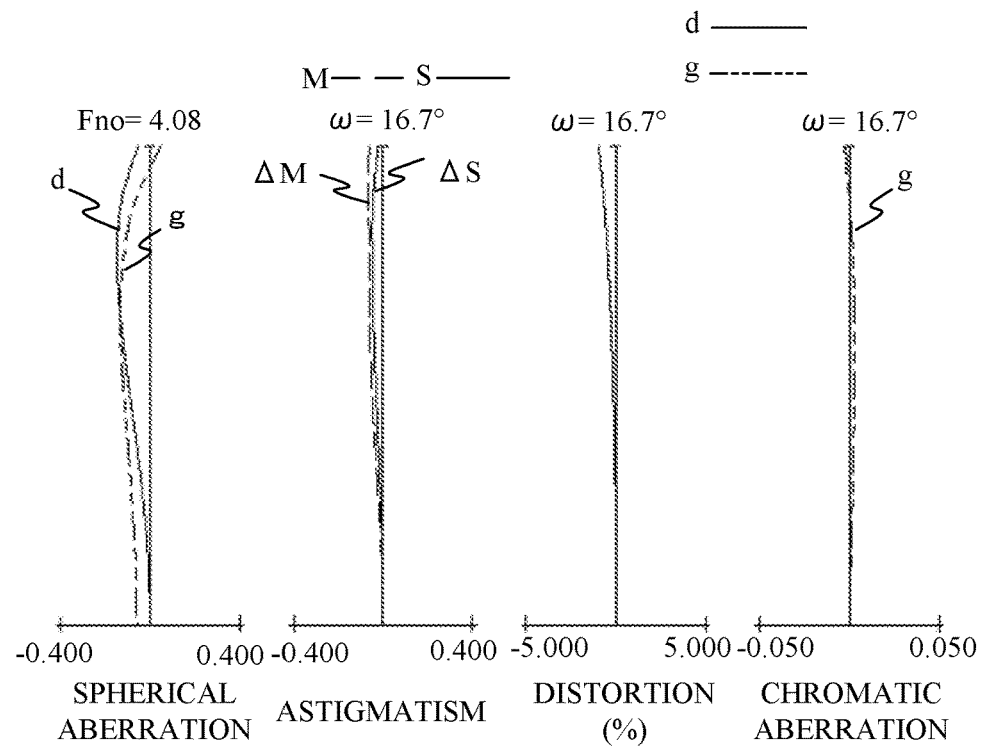
FIGS. 2A and 2B are longitudinal aberration diagrams at the wide-angle end and a telephoto end of the zoom lens according to Example 1.
Figure 2B:
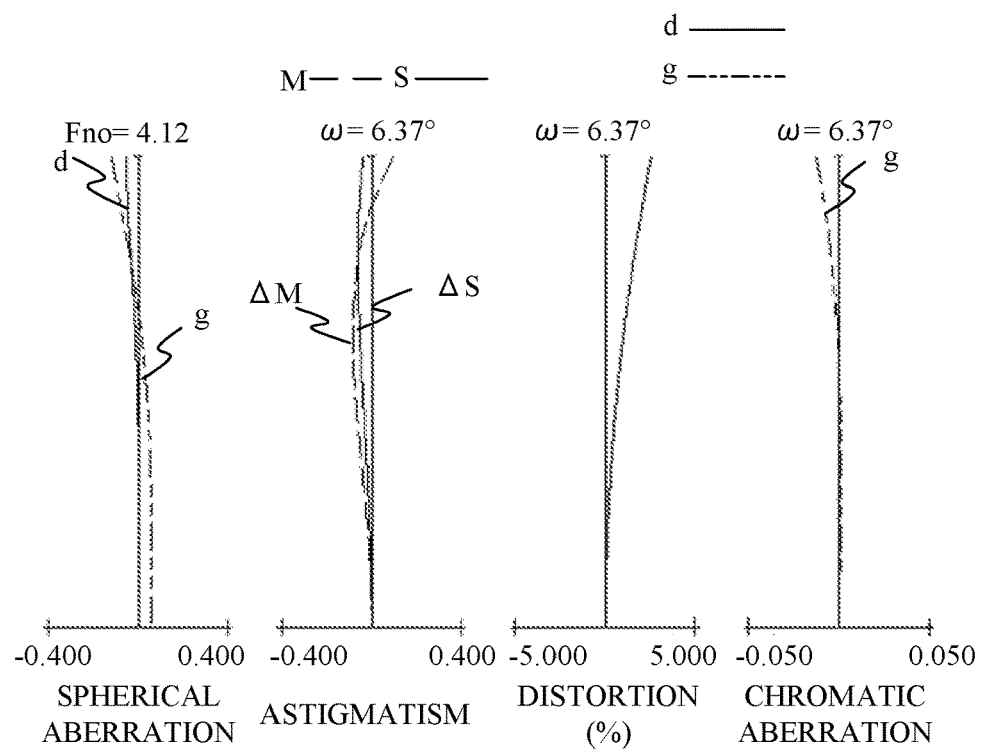
Figure 3:
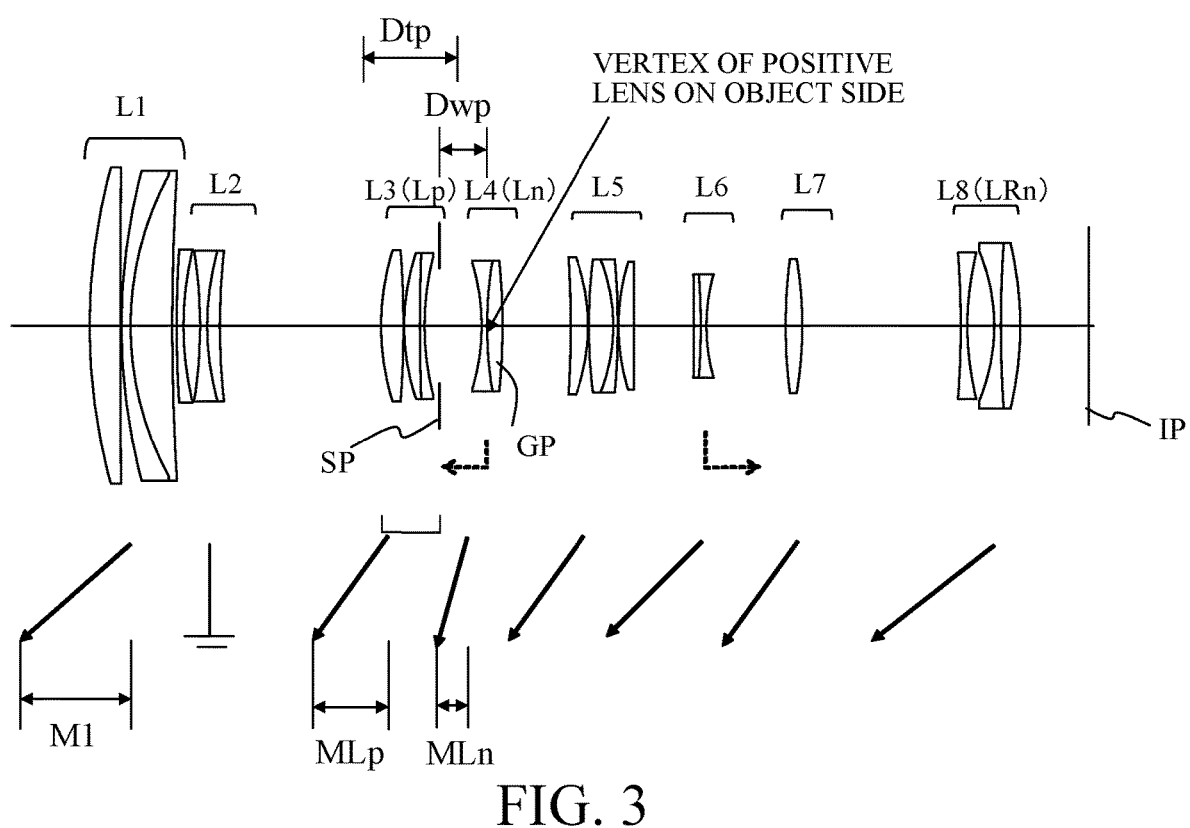
FIG. 3 is a sectional view of a zoom lens according to Example 2 of the present invention at a wide-angle end.
Figure 4A:
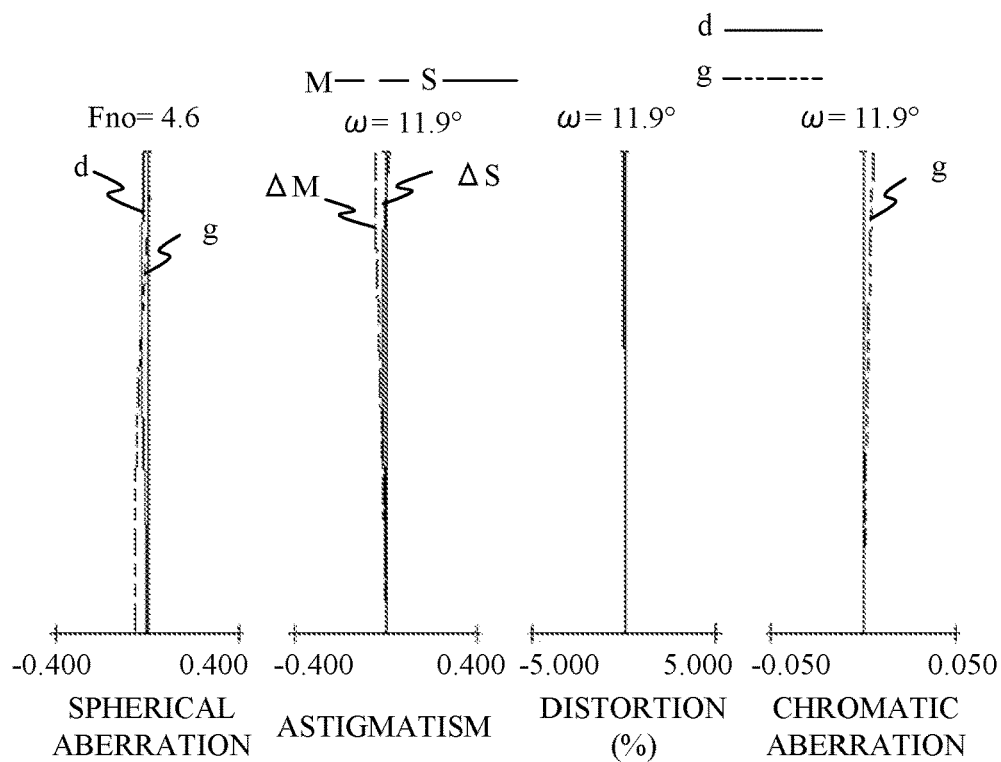
FIGS. 4A and 4B are longitudinal aberration diagrams at the wide-angle end and a telephoto end of the zoom lens according to Example 2.
Figure 4B:
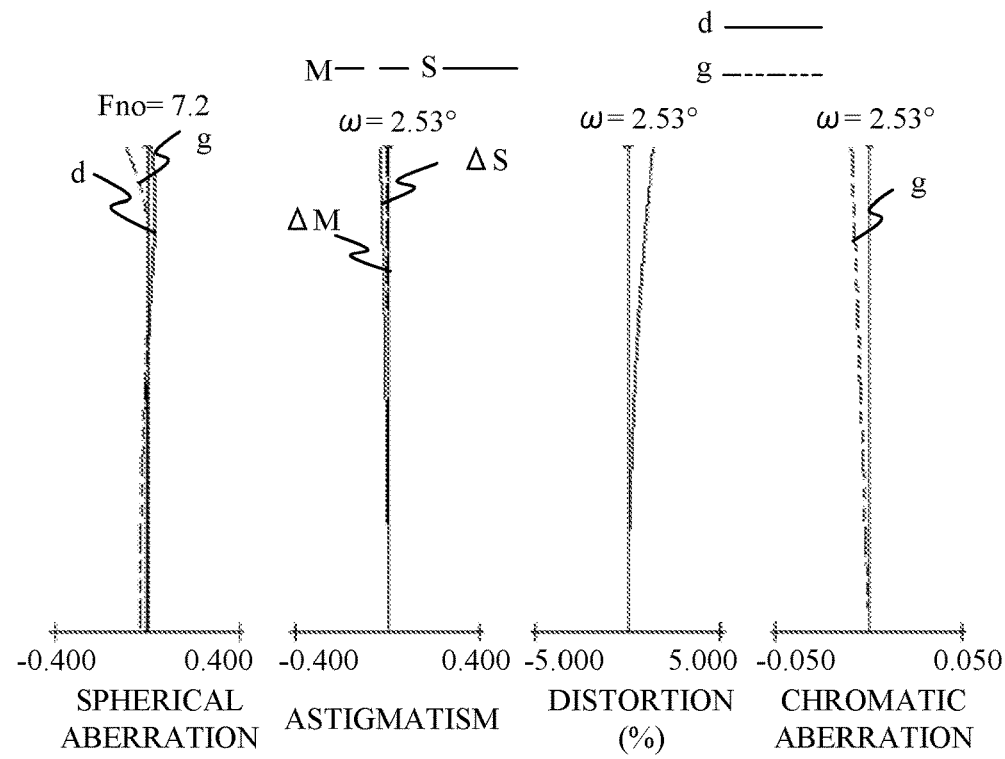
Figure 5:
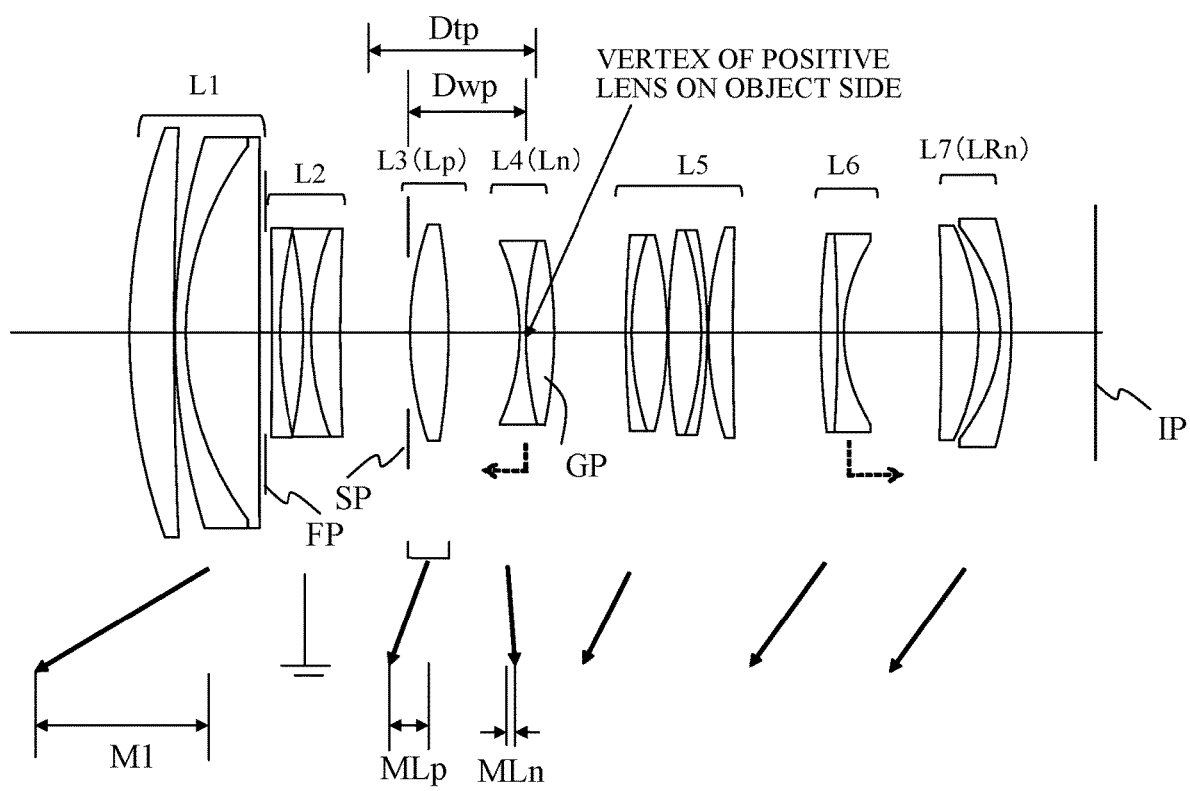
FIG. 5 is a sectional view of a zoom lens according to Example 3 of the present invention at a wide-angle end.
Figure 6A:
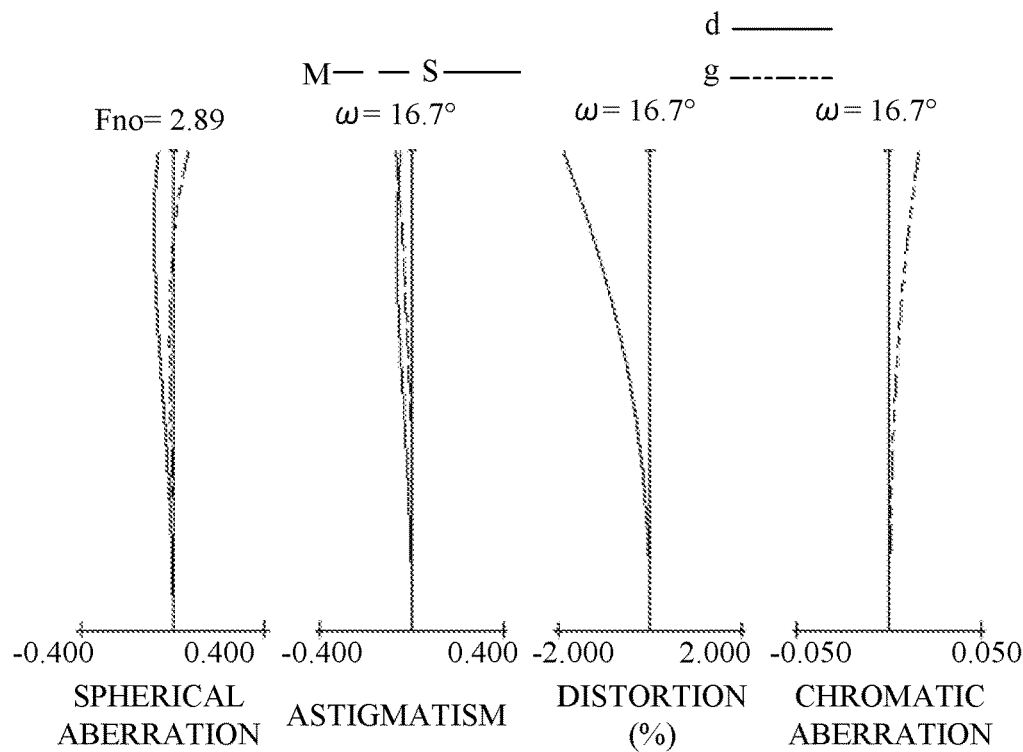
FIGS. 6A and 6B are longitudinal aberration diagrams at the wide-angle end and a telephoto end of the zoom lens according to Example 3.
Figure 6B:
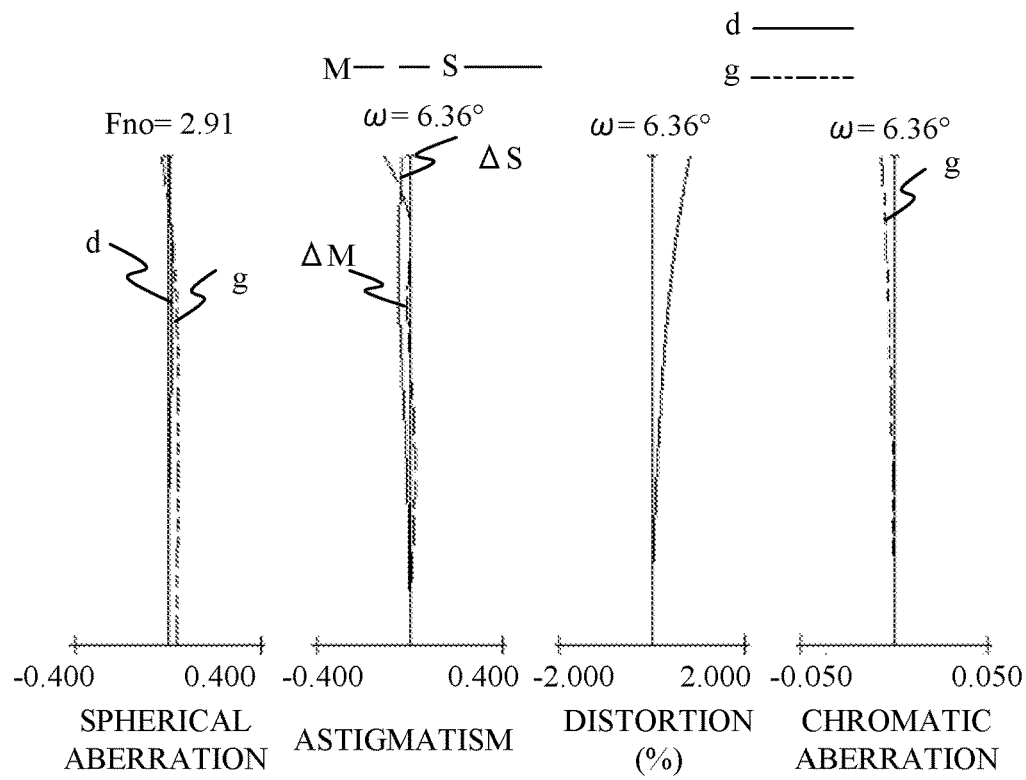
Figure 7:
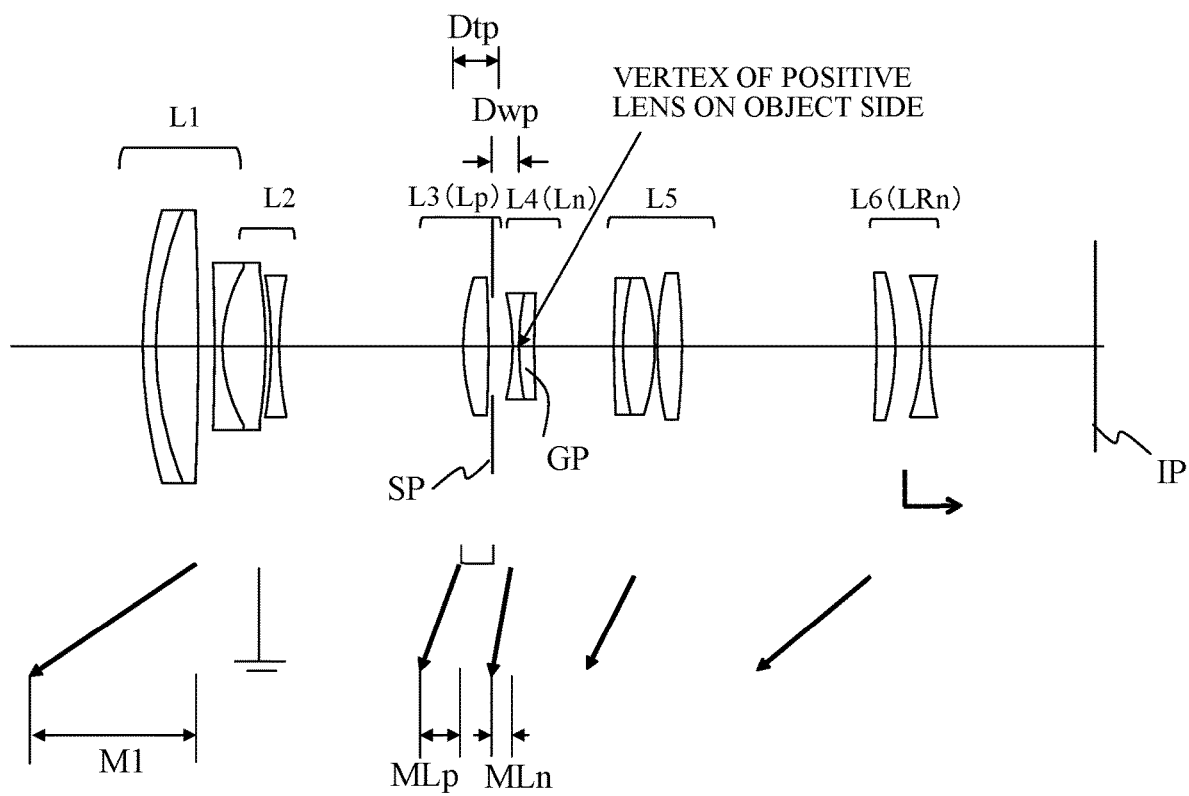
FIG. 7 is a sectional view of a zoom lens according to Example 4 of the present invention at a wide-angle end.
Figure 8A:
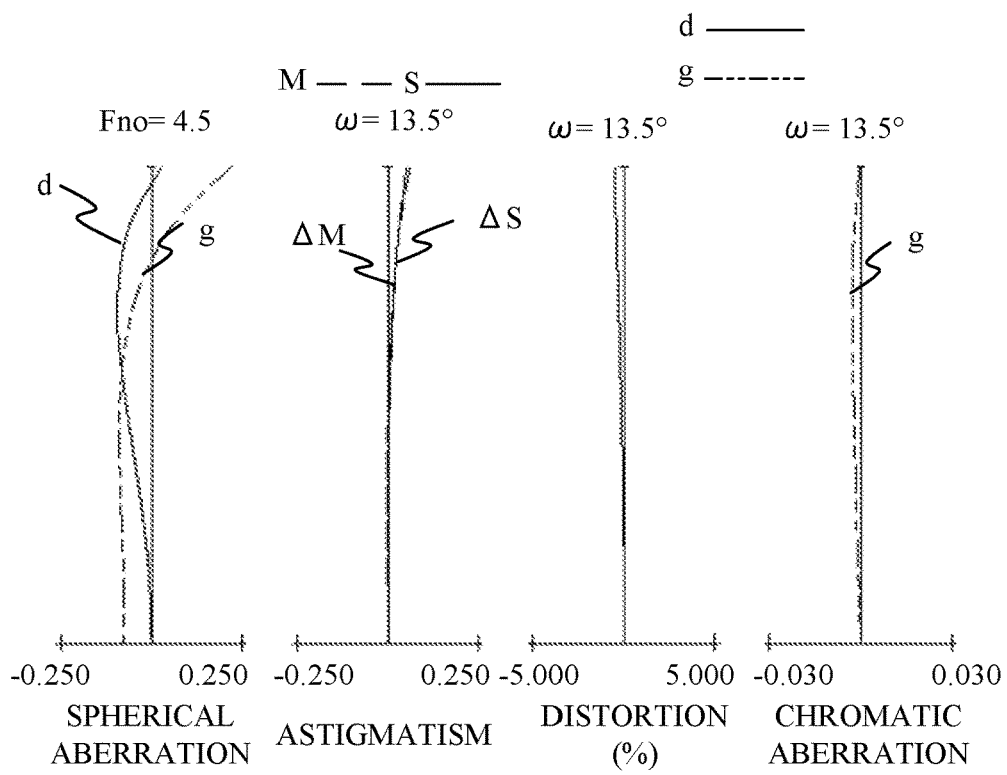
FIGS. 8A and 8B are longitudinal aberration diagrams at the wide-angle end and a telephoto end of the zoom lens according to Example 4.
Figure 8B:
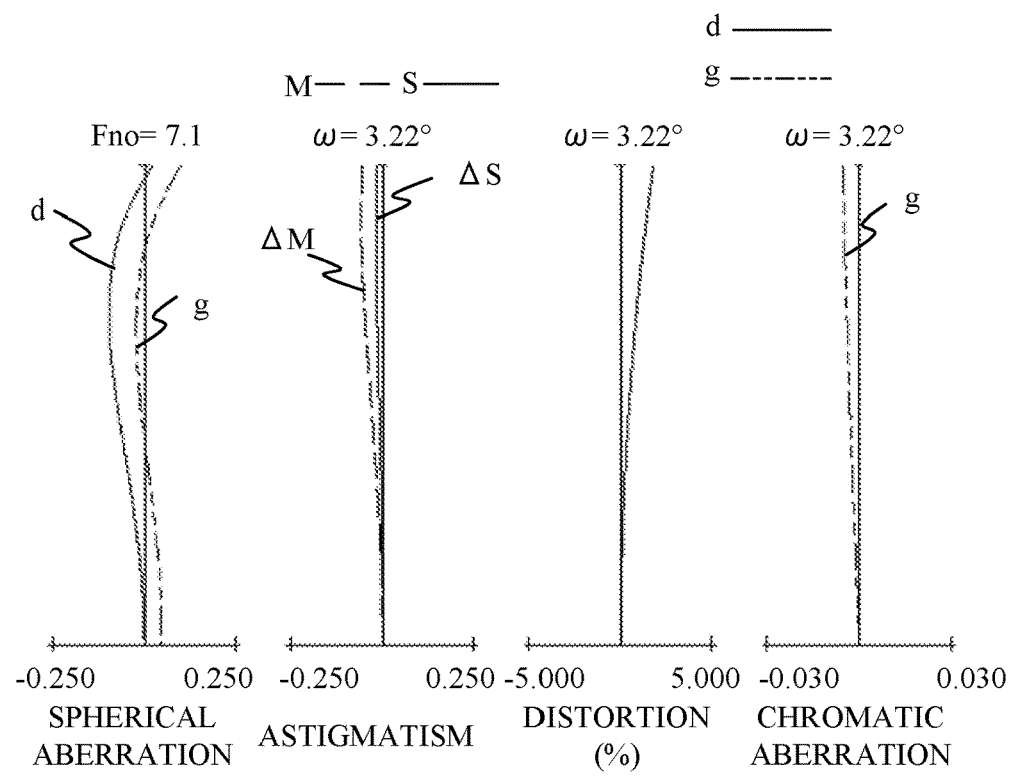
Figure 9:
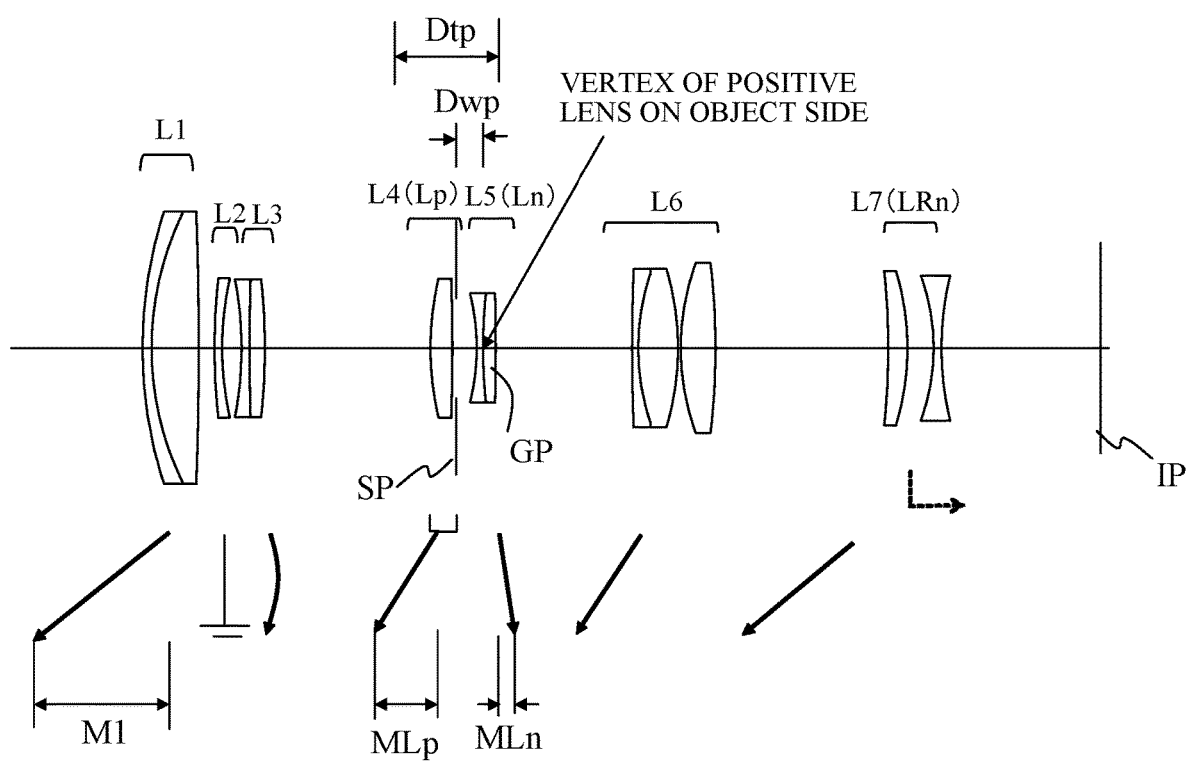
FIG. 9 is a sectional view of a zoom lens according to Example 5 of the present invention at a wide-angle end.
Figure 10A:
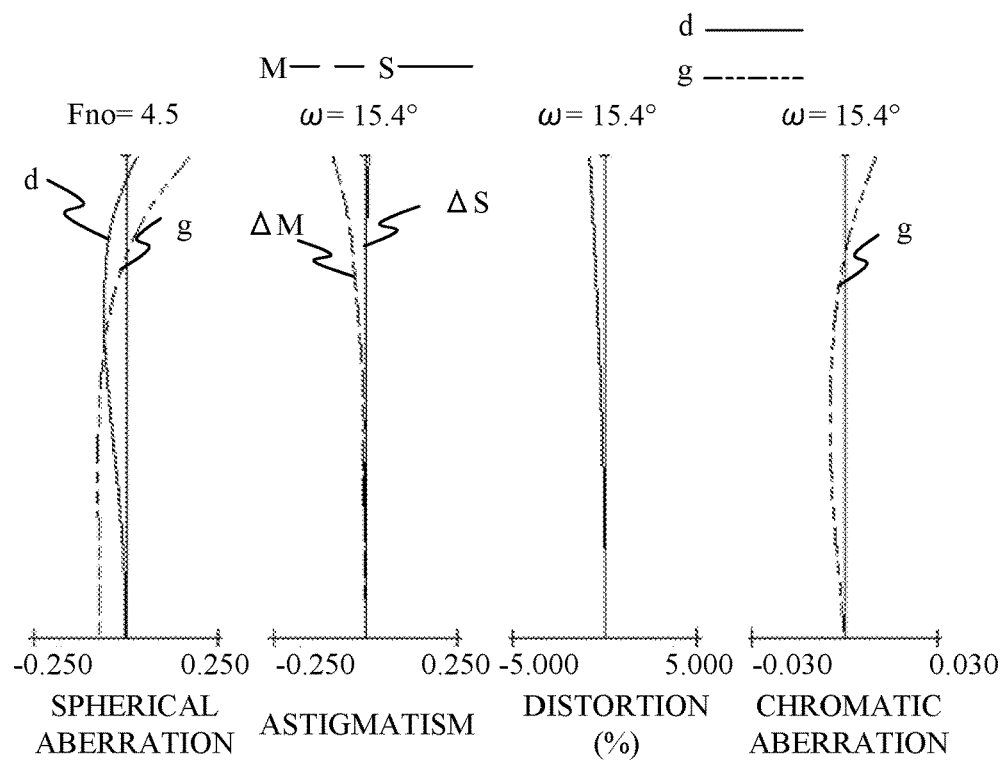
FIGS. 10A and 10B are longitudinal aberration diagrams at the wide-angle end and a telephoto end of the zoom lens according to Example 5.
Figure 10B:
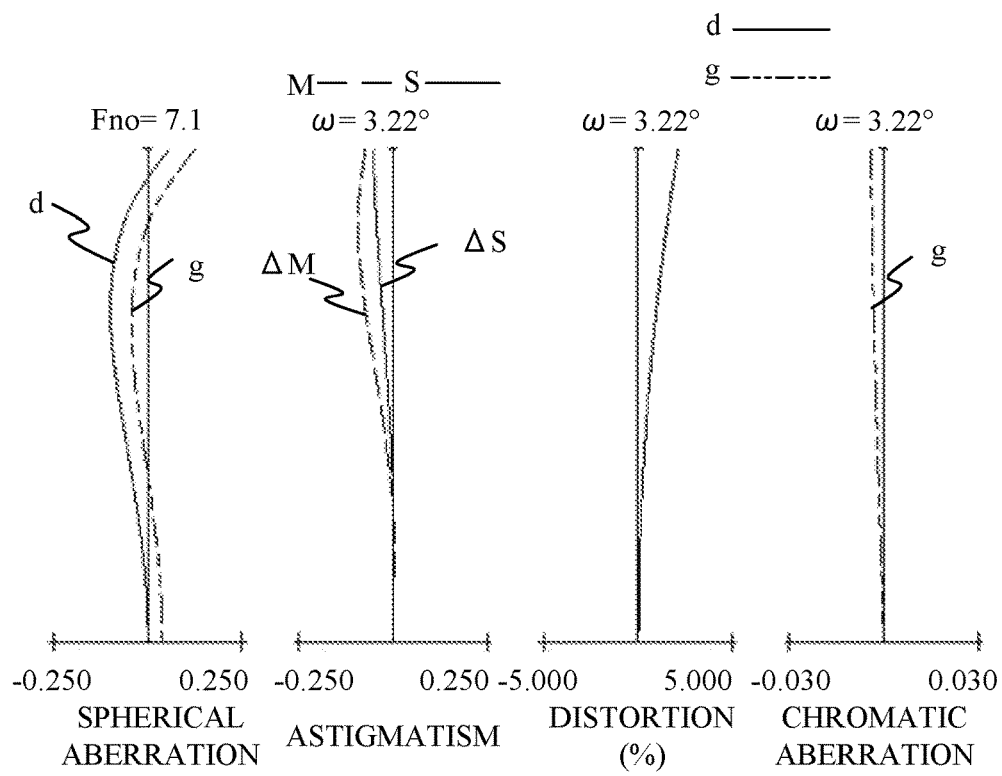

Referring now to the accompanying drawings, a description will be given of embodiments according to the present invention. FIGS. 1, 3, 5, 7 and 9 are sectional views of zoom lenses according to Examples 1, 2, 3, 4 and 5, each of which focuses on infinity (in-focus state on infinity). The zoom lens according to each example is used for an optical apparatus including an image pickup apparatus such as a digital video camera, a digital still camera, a broadcasting camera, a film-based camera, and a surveillance camera, and an interchangeable lens.

In each section, the left side is an object side and the right side is an image side. The zoom lens according to each example includes a plurality of lens units. In each example, the lens unit is a group of lenses that integrally move or is fixed during zooming. In the zoom lens according to each example, a distance between adjacent lens units changes during zooming from the wide-angle end to the telephoto end. The wide-angle end and the telephoto end are zoom states when the lens units that move during zooming are located at both ends in a mechanically movable range in the optical axis direction. The lens unit may include a single lens, or a plurality of lenses. The lens unit may include an aperture stop (diaphragm).

In each sectional view, i (natural number) indicates the order counted from the object side, and Li indicates an i-th lens unit. SP represents an aperture stop (diaphragm). FP represents a flare cutting diaphragm that cuts unnecessary light. IP represents an image plane, and when an optical system L0 according to each example is used as an image pickup optical system for a digital video camera or a digital still camera, an image pickup plane of a solid-state image sensor (photoelectric conversion element such as a CCD sensor and a CMOS sensor) is disposed on the image plane IP. When the optical system L0 according to each example is used as an image pickup optical system for a film-based camera, the photosensitive plane of the film is disposed on the image plane IP.

In the zoom lens according to each example, during zooming from the wide-angle end to the telephoto end, each lens unit is moved as indicated by a solid arrow in each sectional view. During focusing from infinity to a short distance end, each lens unit is moved as indicated by a dotted arrow.

FIGS. 2A, 2B, 4A, 4B, 6A, 6B, 8A, 8B, 10A, and 10B are longitudinal aberration diagrams of the zoom lenses according to Examples 1, 2, 3, 4, and 5, respectively. In each of the aberration diagrams, FIGS. 2A, 4A, 6A, 8A, and 10A are aberration diagrams in the in-focus state on infinity at the wide-angle end, and FIGS. 2B, 4B, 6B, 8B, and 10B are longitudinal aberration diagrams in the in-focus state on the short distance end.

In the spherical aberration diagram, Fno represents an F-number, and in the spherical aberration diagram, spherical aberration amounts for the d-line (wavelength 587.6 nm) and the g-line (wavelength 435.8 nm) are illustrated by a solid line and an alternate long and two short dashes line, respectively. In an astigmatism diagram, ΔS indicates an astigmatism amount on a sagittal image plane (solid line), and ΔM indicates an astigmatism amount on a meridional image plane (broken line). A distortion diagram illustrates a distortion amount for the d-line. A chromatic aberration diagram illustrates a chromatic aberration amount for the g-line. ω is a half angle of view)(°).

Next follows a description of a characteristic configuration and conditions of the zoom lens according to each example. The zoom lens according to each example includes, in order from the object side to the image side, a first lens unit L1 having a positive refractive power, a second lens unit L2 having a negative refractive power, and a rear unit including a plurality of lens units L3, L4, and L5, . . . . During zooming, a distance changes between adjacent lens units of the first, second and plurality of lens units. The rear unit includes the aperture stop SP and a negative lens unit Ln disposed closest to the object among at least one lens unit having a negative refractive power on the image side of the aperture stop SP. In Examples 1 to 4, the negative lens unit Ln is the fourth lens unit L4, and in Example 5, it is the fifth lens unit L5. The negative lens unit Ln includes a positive lens Gp.

Each of the zoom lenses having the above configurations satisfies the following conditions where vdp is an Abbe number of the positive lens Gp for the d-line, θgFp is a partial dispersion ratio of the positive lens Gp for the g-line and the F-line, and Dwp is a distance on the optical axis from the aperture stop SP at the wide-angle end to the vertex on the object side of the positive lens Gp, and Dtp is a distance on the optical axis from the aperture stop SP at the telephoto end to the vertex on the object side of the positive lens Gp.

$$-0.1000 < \theta gFp - (-1.665 \times 10^{-7} \times vdp^3 + 5.213 \times 10^{-5} \times vdp^2 - 5.656 \times 10^{-3} \times vdp + 0.7268) < -0.0010 \quad (1)$$

$$20 < vdp < 50 \quad (2)$$

$$0.10 < Dwp/Dtp < 0.70 \quad (3)$$

The Abbe number vd and the partial dispersion ratio θgF are defined as follows where Nd, NF, NC, and Ng are refractive indices for the d-line, the F-line, the C-line, and the g-line of the Fraunhofer line, respectively.

$$vd = (Nd-1)/(NF-NC)$$

$$\theta gF = (Ng-NF)/(NF-NC)$$

When the zoom lens includes, in order from the object side to the image side, a first lens unit having a positive refractive power, a second lens unit having a negative refractive power, and a rear unit that includes a plurality of lens units, in order to shorten the overall length, the lateral chromatic aberration for the g-line at the telephoto end generally occurs on the underside. Therefore, each example properly correct the chromatic aberration at the telephoto end which increased by shortening the overall lens length, when the positive lens Gp included in the negative lens unit Ln disposed closer to the image than the aperture stop SP is made of a material having a small anomalous dispersion ΔθgF.

According to the paraxial theory, the lateral chromatic aberration is proportional to the product of the incident height of the paraxial on-axis ray and the incident height of the pupil paraxial ray. Herein, the paraxial on-axis ray is a paraxial ray obtained when the focal length of the overall optical system is normalized to 1 and the light with an incident height of 1 from the optical axis is introduced parallel to the optical axis of the optical system. The pupil paraxial ray is a paraxial ray that passes through the intersection between the entrance pupil and the optical axis of the optical system among rays incident at −45° on the optical axis when the focal length of the overall optical system is normalized to 1. Herein, the incident angle on the optical system is positive in the clockwise direction and negative in the counterclockwise direction around the optical axis.

The zoom lens according to each example corrects the lateral chromatic aberration by disposing the negative lens unit Ln at a position where the product of the incident height of the paraxial on-axis ray and the incident height of the pupil paraxial ray at the telephoto end increases. The negative lens unit Ln disposed on the image side of the aperture stop effectively corrects various aberrations generated in the lens unit on the object side of the negative lens unit Ln at the telephoto end.

The conditional expression (1) illustrates a condition regarding the Abbe number vdp and the partial dispersion ratio θgFp of the positive lens Gp. If θgFp−(−1.665 . . . ×vdp² . . . +0.7268) is lower than the lower limit of the conditional expression (1), it becomes difficult to correct the longitudinal and lateral chromatic aberrations at the wide-angle end and the telephoto end, and if the value is higher than the upper limit of the conditional expression (1), it becomes difficult to correct the lateral chromatic aberration at the telephoto end.

The conditional expression (2) shows a condition regarding the Abbe number vdp of the positive lens Gp. If vdp is lower than the lower limit of the conditional expression (2), the light transmittance and stability of the glass of the positive lens Gp lower. When the value is higher than the upper limit of the conditional expression (2), the dispersion becomes too small and it becomes difficult to correct the primary chromatic aberration that occurs in the negative lens in the negative lens unit Ln that is disposed on the image side of the aperture stop SP.

An optical material that satisfies both the conditional expressions (1) and (2) is, for example, product name NBFD13, HOYA Co., Ltd. The product name NBFD13 has an Abbe number of 40.73 and a partial dispersion ratio of 0.5671.

When a material having a small ΔθgF is used for the positive lens Gp included in the negative lens unit Ln, the lateral chromatic aberration for the g-line at the wide-angle end occurs on the over side. Based on the above paraxial theory, the negative lens unit Ln is disposed at a position near the aperture stop SP where the entrance height of the pupil paraxial ray decreases at the wide-angle end, thereby reducing the influence of the lateral chromatic aberration.

The conditional expression (3) shows a condition regarding the distances Dwp and Dtp on the optical axis from the aperture stop SP at the wide-angle end and the telephoto end to the vertex on the object side of the positive lens Gp. If Dwp/Dtp is lower than the lower limit of the conditional expression (3), the distance on the optical axis becomes long from the aperture stop SP to the negative lens unit Ln at the telephoto end, and it becomes difficult to make compact the zoom lens. If Dwp/Dtp is higher than the upper limit of the conditional expression (3), the incident height of the pupil paraxial ray becomes high at the wide-angle end and it becomes difficult to correct the lateral chromatic aberration.

The numerical ranges of the conditional expressions (1) to (3) may be set as in the following conditional expressions (1a) to (3a).

$$-0.0800 < \theta gFp - (-1.665 \times 10^{-7} \times vdp^3 + 5.213 \times 10^{-5} \times vdp^2 - 5.656 \times 10^{-3} \times vdp + 0.7268) < -0.0012 \quad (1a)$$

$$22 < vdp < 45 \quad (2a)$$

$$0.11 < Dwp/Dtp < 0.67 \quad (3a)$$

The numerical ranges of the conditional expressions (1) to (3) may be set as in the following conditional expressions (1b) to (3b).

$$-0.0600 < \theta gFp - (-1.665 \times 10^{-7} \times vdp^3 + 5.213 \times 10^{-5} \times vdp^2 - 5.656 \times 10^{-3} \times vdp + 0.7268) < -0.0014 \quad (1b)$$

$$24 < vdp < 43 \quad (2b)$$

$$0.12 < Dwp/Dtp < 0.65 \quad (3b)$$

Satisfying the conditional expression (1) in the above optical configuration can reduce the longitudinal and lateral chromatic aberrations that may occur in the zoom lens.

The zoom lens according to each example may have the following configuration. The first lens unit L1 located closes to the object and having the positive refractive power may move to the object side during zooming from the wide-angle end to the telephoto end. This configuration can make short the overall optical length at the wide-angle end of the zoom lens, and make compact the zoom lens. The first lens unit L1 having the positive refractive power and the negative lens unit Ln disposed on the image side of the aperture stop SP may include three or lenses or less. This makes it possible to reduce the size of the negative lens unit Ln. The aperture stop SP disposed on the image side of the second lens unit L2 can properly set the balance between the effective diameter of the first lens unit L1 and the effective diameter of the rear lens unit, and can improve the performance and make compact the overall system (zoom lens).

The positive lens unit Lp may be disposed between the second lens unit L2 and the negative lens unit Ln. Thereby, the lens diameter of the negative lens unit Ln can be reduced, and the negative lens unit Ln can be made compact. In Examples 1 to 4, the positive lens unit Lp is the third lens unit L3, and in Example 5, it is the fourth lens unit L4.

The negative lens unit LRn may be disposed closes to the image and adopt the telephoto arrangement. This configuration can provide a zoom lens in which the principal point is long relative to the overall length of the zoom lens and the overall length is short relative to the focal length. The negative lens unit LRn closest to the image in Examples 1, 3, and 5 is a seventh lens unit L7, an eighth lens unit L8 in Example 2, and a sixth lens unit L6 in Example 4.

The positive lens unit Lp and the aperture stop SP disposed between the second lens unit L2 and the negative lens unit Ln may integrally move during zooming. Thereby, the one-sided aperture state becomes less likely during zooming.

The zoom lens according to each example may satisfy at least one of the following conditional expressions (4) to (12).

$$1.65 < ndp < 2.10 \quad (4)$$

$$0.05 < SKw/fw < 0.50 \quad (5)$$

$$1.0 < LDw/fw < 3.5 \quad (6)$$

$$0.10 < fGp/f1 < 1.20 \quad (7)$$

$$-0.80 < f2/f1 < -0.10 \quad (8)$$

$$-3.00 < fRn/f1 < -0.10 \quad (9)$$

$$0 < |MLp/M1| < 0.50 \quad (10)$$

$$0 < |MLn/M1| < 0.40 \quad (11)$$

$$65 < vdL1Pave. < 99 \quad (12)$$

The conditional expression (4) represents a condition regarding the refractive index ndp of the positive lens Gp included in the negative lens unit Ln for the d-line. If ndp is lower than the lower limit of the conditional expression (4), the radius of curvature becomes small in order to give the positive lens Gp the necessary refractive power and it becomes difficult to correct the astigmatism. If ndp is higher than the upper limit of conditional expression (4), the radius of curvature of the positive lens Gp becomes large and it becomes difficult to correct the spherical aberration at the wide-angle end.

The conditional expression (5) shows a condition regarding the backfocus SKw of the zoom lens at the wide-angle end and the focal length fw of the overall system at the wide-angle end. When SKw/fw is lower than the lower limit of the conditional expression (5), the backfocus SKw becomes short and it is difficult to dispose an optical element such as a low-pass filter near the image sensor that photoelectrically converts the optical image formed by this zoom lens. If SKw/fw is higher than the upper limit of the conditional expression (5), the backfocus SKw becomes long, the overall optical length of the zoom lens at the wide-angle end becomes long, and the compact configuration becomes difficult.

The conditional expression (6) shows a condition regarding the overall total length LDw of the zoom lens at the wide-angle end and the focal length fw of the overall system at the wide-angle end. If LDw/fw is lower than the lower limit of the conditional expression (6), the focal length fw of the overall system at the wide-angle end becomes long and it becomes difficult to achieve a high zoom ratio of the zoom lens. If LDw/fw is higher than the upper limit of the conditional expression (6), the overall total length LDw at the wide-angle end becomes long and it becomes difficult to make compact the zoom lens.

The conditional expression (7) shows a condition regarding the focal length fGp of the positive lens Gp and the focal length f1 of the first lens unit L1. If fGp/f1 is lower than the lower limit of the conditional expression (7), the focal length fGp of the positive lens Gp becomes short and it becomes difficult to correct the spherical aberration. If fGp/f1 is higher than the upper limit of the conditional expression (7), the focal length fGp of the positive lens Gp becomes long and it becomes difficult to correct the lateral chromatic aberration at the telephoto end.

The conditional expression (8) shows a condition regarding the focal length f1 of the first lens unit L1 and the focal length f2 of the second lens unit L2. When f2/f1 is lower than the lower limit of the conditional expression (8), the focal length f1 of the first lens unit L1 becomes long, the moving amount of the first lens unit L1 becomes large during zooming from the wide-angle end to the telephoto end, and it becomes difficult to reduce the size of the zoom lens. When f2/f1 is higher than the upper limit of the conditional expression (8), the focal length f1 of the first lens unit L1 becomes short and it becomes difficult to correct the spherical aberration generated in the first lens unit L1.

The conditional expression (9) shows a condition regarding the focal length fRn of the lens unit LRn closest to the image and the focal length f1 of the first lens unit L1. When fRn/f1 is lower than the lower limit of the conditional expression (9), the focal length fRn of the lens unit LRn closest to the image becomes long and it becomes difficult to make the principal point long relative to the overall length of the zoom lens and to reduce the size of the zoom lens. If fRn/f1 is higher than the upper limit of the conditional expression (9), the focal length fRn of the lens unit LRn closest to the image becomes short, and it becomes difficult to correct the field curvature and distortion.

The conditional expression (10) shows a condition regarding a moving amount M1 of the first lens unit L1 during zooming from the wide-angle end to the telephoto end and a moving amount MLp of the positive lens unit Lp disposed between the aperture stop SP and the negative lens unit Ln during the same zooming. If |MLp/M1| is lower than the lower limit of the conditional expression (10), the moving amount M1 of the first lens unit L1 becomes long and it becomes difficult to make compact the zoom lens. If |MLp/M1| is higher than the upper limit of the conditional expression (10), the moving amount MLp of the positive lens unit Lp becomes long and it becomes difficult to make compact the zoom lens.

The conditional expression (11) shows a condition regarding the moving amount M1 of the first lens unit L1 during zooming from the wide-angle end to the telephoto end and the moving amount MLn of the negative lens unit Ln during the same zooming. If |MLn/M1| is lower than the lower limit of the conditional expression (11), the moving amount M1 of the first lens unit L1 becomes long and it becomes difficult to make compact the zoom lens. If |MLn/M1| is higher than the upper limit of the conditional expression (11), the moving amount MLn of the negative lens unit Ln becomes long and it becomes difficult to make compact the zoom lens.

The conditional expression (12) shows a condition regarding the average value vdL1Pave. of Abbe numbers of at least two positive lenses included in the first lens unit L1 for the d-line. If vdL1Pave. is lower than the lower limit of the conditional expression (12), it becomes difficult to correct the longitudinal and lateral chromatic aberrations at the telephoto end. If vdL1Pave. is higher than the upper limit of the conditional expression (12), the dispersion of the positive lens becomes too small and it becomes difficult to correct the lateral chromatic aberration at the wide-angle end.

The numerical ranges of the conditional expressions (4) to (12) may be set as in the following conditional expressions (4a) to (12a).

$$1.66 < ndp < 2.07 \tag{4a}$$

$$0.10 < SKw/fw < 0.45 \tag{5a}$$

$$1.2 < LDw/fw < 30.0 \tag{6a}$$

$$0.12 < fGp/f1 < 1.10 \tag{7a}$$

$$-0.70 < f2/f1 < -0.20 \tag{8a}$$

$$-2.50 < fN/f1 < -0.20 \tag{9a}$$

$$0 < |MLp/M1| < 0.40 \tag{10a}$$

$$0 < |MLn/M1| < 0.30 \tag{11a}$$

$$70 < vdL1Pave. < 98 \tag{12a}$$

The numerical ranges of the conditional expressions (4) to (12) may be set as in the following conditional expressions (4b) to (12b).

$$1.67 < ndp < 2.00 \tag{4b}$$

$$0.14 < SKw/fw < 0.43 \tag{5b}$$

$$1.5 < LDw/fw < 2.6 \tag{6b}$$

$$0.15 < fGp/f1 < 1.00 \tag{7b}$$

$$-0.65 < f2/f1 < -0.30 \tag{8b}$$

$$-20.20 < fN/f1 < -0.23 \tag{9b}$$

$$0 < |MLp/M1| < 0.36 \tag{10b}$$

$$0 < |MLn/M1| < 0.25 \tag{11b}$$

$$75 < vdL1Pave. < 95 \tag{12b}$$

Numerical examples 1 to 5 corresponding to Examples 1 to 6 will be shown below. In each numerical example, each surface of the optical system is given a surface number i (i is a natural number) counted from the object side. "r" represents a radius of curvature of each surface (mm), "d" represents a lens thickness or distance (air gap) (mm) on the optical axis between a surface with a surface number i and a surface with a surface number (i+1), and nd represents a refractive index of a material of an optical element having each surface for the d-line. vd is an Abbe number for the d-line of the material of the optical element having each surface.

The focal length (mm), F-number, and half angle of view)(°) are values when the optical system focuses on an object at infinity. An "overall lens length" is a length obtained by adding the backfocus SK to a distance on the optical axis from the frontmost surface (lens surface closest to the object) to the final surface (lens surface closest to the image) in the optical system. The "backfocus SK" is a distance on the optical axis from the final lens surface of the optical system to the image plane.

The "*" attached to the surface number means that the surface has an aspherical shape. The aspherical shape is expressed by the following expression where x is a displacement amount from the surface vertex in the optical axis direction, h is a height from the optical axis in a direction orthogonal to the optical axis, a light traveling direction is set to be positive, R is a paraxial radius of curvature, k is a conic constant, and A4, A6, A8, A10, and A12 are aspherical coefficients, and the aspherical coefficient "e-x" means 10-x.

$$x=(h^2/R)/[1+\{1-(1+k)(h/R)^2\}^{1/2}+A4\times h^4+A6\times h^6+A8\times h^8+A10\times h^{10}+A12\times h^{12}$$

Table 1 summarizes values corresponding to the conditional expressions (1) to (12) in the numerical examples 1 to 5.

Numerical Example 1

UNIT mm

Surface data

| Surface number | r | d | nd | vd |
|---|---|---|---|---|
| 1 | 90.644 | 5.00 | 1.48749 | 70.2 |
| 2 | 729.457 | 0.15 | | |
| 3 | 118.536 | 1.72 | 1.61340 | 44.3 |
| 4 | 44.444 | 7.63 | 1.49700 | 81.5 |
| 5 | 701.885 | (variable) | | |
| 6 | ∞ | 1.55 | | |
| 7 | 61.503 | 1.45 | 1.51633 | 64.1 |
| 8 | 30.444 | 4.90 | | |
| 9 | −46.693 | 1.45 | 1.54072 | 47.2 |
| 10 | 42.460 | 2.40 | 2.00069 | 25.5 |
| 11 | 129.562 | (variable) | | |
| 12(diaphragm) | ∞ | 0.27 | | |
| 13 | 30.808 | 5.46 | 1.49700 | 81.5 |
| 14 | −114.560 | (variable) | | |
| 15 | −34.891 | 0.76 | 1.76385 | 48.5 |
| 16 | 21.946 | 5.06 | 1.80610 | 40.7 |
| 17 | −157.249 | (variable) | | |
| 18 | 215.866 | 0.86 | 2.05090 | 26.9 |
| 19 | 32.638 | 6.46 | 1.49700 | 81.5 |
| 20 | −41.283 | 0.15 | | |
| 21 | 40.548 | 4.63 | 1.83481 | 42.7 |
| 22 | −194.106 | (variable) | | |
| 23 | −110.386 | 0.90 | 1.83481 | 42.7 |
| 24 | 32.543 | 3.04 | 1.72825 | 28.5 |
| 25 | 77.918 | (variable) | | |
| 26 | −27.078 | 1.55 | 1.49700 | 81.5 |
| 27 | −77.278 | 0.15 | | |
| 28 | 133.694 | 2.87 | 1.85478 | 24.8 |
| 29 | −465.663 | (variable) | | |
| image plane | ∞ | | | |

VARIOUS DATA
Zoom Ratio 2.68

| | Wide-angle | Middle | Telephoto |
|---|---|---|---|
| Focal length | 72.27 | 135.02 | 193.89 |
| F-number | 4.08 | 4.08 | 4.12 |
| Half angle of view | 16.67 | 9.10 | 6.37 |
| Image height | 21.64 | 21.64 | 21.64 |
| Overall lens length | 137.50 | 175.84 | 193.12 |
| SK | 14.44 | 24.23 | 29.66 |
| d 5 | 1.04 | 39.38 | 56.66 |
| d11 | 14.15 | 7.90 | 3.56 |
| d14 | 5.42 | 9.82 | 13.52 |
| d17 | 9.21 | 4.80 | 1.11 |
| d22 | 18.91 | 9.71 | 2.24 |
| d25 | 15.94 | 21.59 | 27.98 |
| d29 | 14.44 | 24.23 | 29.66 |

-continued

UNIT mm

LENS UNIT DATA

| Unit | Starting surface | Focal length |
|---|---|---|
| 1 | 1 | 151.61 |
| 2 | 6 | −58.12 |
| 3 | 12 | 49.47 |
| 4 | 15 | −69.02 |
| 5 | 18 | 37.79 |
| 6 | 23 | −49.00 |
| 7 | 26 | −295.37 |

Numerical Example 2

UNIT mm

Surface data

| Surface number | r | d | nd | vd |
|---|---|---|---|---|
| 1 | 130.951 | 6.78 | 1.43875 | 94.7 |
| 2 | 5156.894 | 0.20 | | |
| 3 | 132.263 | 2.00 | 1.61340 | 44.3 |
| 4 | 69.599 | 9.09 | 1.43875 | 94.7 |
| 5 | 524.473 | (variable) | | |
| 6 | 261.347 | 1.50 | 1.59282 | 68.6 |
| 7 | 70.880 | 3.69 | | |
| 8 | −97.743 | 1.50 | 1.49700 | 81.5 |
| 9 | 60.846 | 2.73 | 1.72047 | 34.7 |
| 10 | 138.808 | (variable) | | |
| 11 | 55.392 | 4.94 | 1.49700 | 81.5 |
| 12 | −204.607 | 0.10 | | |
| 13 | 50.366 | 3.47 | 1.75211 | 25.1 |
| 14 | 458.842 | 1.00 | 2.05090 | 26.9 |
| 15 | 61.423 | 3.25 | | |
| 16(diaphragm) | ∞ | (variable) | | |
| 17 | −47.182 | 1.10 | 1.83400 | 37.2 |
| 18 | 80.000 | 3.48 | 1.85025 | 30.1 |
| 19 | −138.294 | (variable) | | |
| 20 | −221.431 | 3.92 | 1.69895 | 30.1 |
| 21 | −42.400 | 0.10 | | |
| 22 | 108.557 | 5.41 | 1.49700 | 81.5 |
| 23 | −39.324 | 1.00 | 2.05090 | 26.9 |
| 24 | −159.423 | 0.10 | | |
| 25 | 46.337 | 3.43 | 1.49700 | 81.5 |
| 26 | ∞ | (variable) | | |
| 27 | −518.107 | 1.50 | 1.53172 | 48.8 |
| 28 | −135.940 | 1.20 | 1.61800 | 63.4 |
| 29 | 41.451 | (variable) | | |
| 30 | 105.992 | 3.70 | 1.51742 | 52.4 |
| 31 | −89.325 | (variable) | | |
| 32 | −187.453 | 1.40 | 1.59282 | 68.6 |
| 33 | 66.735 | 5.91 | | |
| 34 | −41.898 | 1.40 | 1.49700 | 81.5 |
| 35 | 256.102 | 4.27 | 1.72047 | 34.7 |
| 36 | −77.338 | (variable) | | |
| image plane | ∞ | | | |

VARIOUS DATA
Zoom Ratio 4.76

| | Wide-angle | Middle | Telephoto |
|---|---|---|---|
| Focal length | 103.04 | 198.65 | 489.97 |
| F-number | 4.60 | 5.20 | 7.20 |
| Half angle of view | 11.86 | 6.22 | 2.53 |
| Image height | 21.64 | 21.64 | 21.64 |
| Overall lens length | 219.06 | 268.17 | 319.06 |
| SK | 14.98 | 38.95 | 82.80 |
| d 5 | 1.00 | 50.12 | 101.00 |
| d10 | 35.44 | 23.54 | 0.48 |

-continued

UNIT mm

| d16 | 9.27 | 14.63 | 23.48 |
|---|---|---|---|
| d19 | 14.92 | 9.56 | 0.72 |
| d26 | 13.13 | 10.67 | 1.15 |
| d29 | 17.29 | 19.75 | 29.28 |
| d31 | 34.85 | 22.78 | 1.99 |
| d36 | 14.98 | 38.95 | 82.80 |

LENS UNIT DATA

| Unit | Starting surface | Focal length |
|---|---|---|
| 1 | 1 | 217.47 |
| 2 | 6 | −77.56 |
| 3 | 11 | 91.63 |
| 4 | 17 | −90.45 |
| 5 | 20 | 47.52 |
| 6 | 27 | −60.23 |
| 7 | 30 | 94.29 |
| 8 | 32 | −76.45 |

Numerical Example 3

UNIT mm

Surface data

| Surface number | r | d | nd | vd |
|---|---|---|---|---|
| 1 | 103.053 | 7.52 | 1.49700 | 81.5 |
| 2 | 725.524 | 0.20 | | |
| 3 | 112.009 | 1.80 | 1.61340 | 44.3 |
| 4 | 52.969 | 12.50 | 1.43875 | 94.7 |
| 5 | ∞ | (variable) | | |
| 6 | ∞ | 1.08 | | |
| 7 | −2555.714 | 1.40 | 1.59282 | 68.6 |
| 8 | 68.931 | 4.02 | | |
| 9 | −82.201 | 1.30 | 1.76385 | 48.5 |
| 10 | 48.635 | 4.99 | 1.85478 | 24.8 |
| 11 | 406.572 | (variable) | | |
| 12(diaphragm) | ∞ | 0.30 | | |
| 13* | 55.885 | 6.56 | 1.49700 | 81.5 |
| 14 | −109.609 | (variable) | | |
| 15 | −36.129 | 1.00 | 1.60342 | 38.0 |
| 16 | 63.489 | 4.84 | 1.73800 | 32.3 |
| 17 | −77.556 | (variable) | | |
| 18 | 179.554 | 1.00 | 2.05090 | 26.9 |
| 19 | 54.696 | 6.07 | 1.49700 | 81.5 |
| 20 | −65.807 | 0.15 | | |
| 21 | 102.171 | 5.62 | 1.49700 | 81.5 |
| 22 | −55.362 | 1.00 | 2.05090 | 26.9 |
| 23 | −87.700 | 0.15 | | |
| 24 | 57.524 | 4.17 | 1.88300 | 40.8 |
| 25 | 554.215 | (variable) | | |
| 26 | 144.214 | 2.88 | 1.66565 | 35.6 |
| 27 | −251.120 | 1.00 | 1.69680 | 55.5 |
| 28 | 28.677 | (variable) | | |
| 29 | −445.944 | 6.31 | 1.85478 | 24.8 |
| 30 | −41.161 | 3.64 | | |
| 31* | −22.920 | 1.90 | 1.80100 | 35.0 |
| 32 | −70.502 | (variable) | | |
| image plane | ∞ | | | |

-continued

UNIT mm

ASPHERIC DATA

13th surface

K = 0.00000e+000 A 4 = −8.76146e−007 A 6 = 5.67123e−010 A 8 = 1.84872e−013

31st surface

K = 0.00000e+000 A 4 = 1.18552e−005 A 6 = 1.25785e−008 A 8 = 3.61618e−012 A10 = 1.46291e−014 A12 = 7.87900e−017

VARIOUS DATA
Zoom Ratio 2.69

| | Wide-angle | Middle | Telephoto |
|---|---|---|---|
| Focal length | 72.10 | 135.00 | 194.00 |
| F-number | 2.89 | 2.89 | 2.91 |
| Half angle of view | 16.70 | 9.10 | 6.36 |
| Image height | 21.64 | 21.64 | 21.64 |
| Overall lens length | 163.87 | 208.65 | 224.89 |
| SK | 14.23 | 24.02 | 29.52 |
| d 5 | 1.00 | 45.78 | 62.02 |
| d11 | 11.47 | 8.33 | 3.88 |
| d14 | 12.05 | 18.97 | 23.08 |
| d17 | 12.17 | 5.26 | 1.14 |
| d25 | 14.88 | 7.07 | 1.10 |
| d28 | 16.67 | 17.84 | 22.76 |
| d32 | 14.23 | 24.02 | 29.52 |

LENS UNIT DATA

| Unit | Starting surface | Focal length |
|---|---|---|
| 1 | 1 | 158.38 |
| 2 | 6 | −53.20 |
| 3 | 12 | 75.47 |
| 4 | 15 | −219.32 |
| 5 | 18 | 41.85 |
| 6 | 26 | −51.16 |
| 7 | 29 | −337.91 |

Numerical Example 4

UNIT mm

Surface data

| Surface number | r | d | nd | vd |
|---|---|---|---|---|
| 1 | 63.487 | 1.70 | 1.95375 | 32.3 |
| 2 | 46.145 | 5.50 | 1.49700 | 81.5 |
| 3 | −412.764 | (variable) | | |
| 4 | −291.337 | 1.00 | 1.51742 | 52.4 |
| 5 | 20.318 | 5.63 | 1.67300 | 38.3 |
| 6 | −59.893 | 0.74 | | |
| 7 | −52.272 | 1.00 | 1.77250 | 49.6 |
| 8 | 44.080 | (variable) | | |
| 9 | 29.952 | 3.28 | 1.49700 | 81.5 |
| 10 | −171.152 | 0.50 | | |
| 11(diaphragm) | ∞ | (variable) | | |
| 12 | −28.710 | 0.80 | 1.70300 | 52.4 |
| 13 | 34.075 | 2.00 | 1.67300 | 38.3 |
| 14 | 134.433 | (variable) | | |
| 15 | 141.263 | 1.20 | 2.05090 | 26.9 |
| 16 | 39.129 | 4.11 | 1.49700 | 81.5 |
| 17 | −28.244 | 0.33 | | |

-continued

UNIT mm

| | | | | |
|---|---|---|---|---|
| 18 | 44.211 | 3.21 | 1.65844 | 50.9 |
| 19 | −78.835 | (variable) | | |
| 20 | −143.738 | 2.45 | 1.78880 | 28.4 |
| 21 | −35.836 | 3.43 | | |
| 22 | −28.098 | 1.00 | 1.75500 | 52.3 |
| 23 | 44.815 | (variable) | | |
| image plane | ∞ | | | |

VARIOUS DATA
Zoom Ratio 4.27

| | Wide-angle | Middle | Telephoto |
|---|---|---|---|
| Focal length | 56.85 | 153.09 | 242.93 |
| F-number | 4.50 | 6.80 | 7.10 |
| Half angle of view | 13.51 | 5.10 | 3.22 |
| Image height | 13.66 | 13.66 | 13.66 |
| Overall lens length | 123.69 | 176.37 | 188.73 |
| SK | 21.47 | 42.70 | 66.84 |
| d 3 | 2.12 | 54.79 | 67.15 |
| d 8 | 23.94 | 16.78 | 1.93 |
| d11 | 2.63 | 8.76 | 11.13 |
| d14 | 10.39 | 4.26 | 1.89 |
| d19 | 25.27 | 11.20 | 1.92 |
| d23 | 21.47 | 42.70 | 66.84 |

LENS UNIT DATA

| Unit | Starting surface | Focal length |
|---|---|---|
| 1 | 1 | 155.79 |
| 2 | 4 | −69.66 |
| 3 | 9 | 51.57 |
| 4 | 12 | −32.69 |
| 5 | 15 | 29.20 |
| 6 | 20 | −40.09 |

Numerical Example 5

UNIT mm

Surface data

| Surface number | r | d | nd | vd |
|---|---|---|---|---|
| 1 | 57.496 | 1.20 | 1.85150 | 40.8 |
| 2 | 40.223 | 6.14 | 1.49700 | 81.5 |
| 3 | −457.189 | (variable) | | |
| 4 | 79.212 | 1.00 | 2.00100 | 29.1 |
| 5 | 40.897 | (variable) | | |
| 6 | −44.478 | 1.00 | 1.77250 | 49.6 |
| 7 | 300.870 | 2.02 | 1.85478 | 24.8 |
| 8 | −78.566 | (variable) | | |
| 9 | 39.166 | 2.86 | 1.48749 | 70.2 |
| 10 | −265.887 | 0.50 | | |
| 11(diaphragm) | ∞ | (variable) | | |
| 12 | −29.254 | 0.80 | 1.61800 | 63.4 |
| 13 | 61.405 | 1.67 | 1.85478 | 24.8 |
| 14 | −243.699 | (variable) | | |
| 15 | 222.427 | 0.80 | 2.05090 | 26.9 |
| 16 | 30.476 | 5.19 | 1.59282 | 68.6 |
| 17 | −35.498 | 0.33 | | |
| 18 | 31.929 | 4.57 | 1.51633 | 64.1 |
| 19 | −86.557 | (variable) | | |
| 20 | −92.521 | 2.49 | 1.85478 | 24.8 |
| 21 | −34.205 | 3.40 | | |
| 22 | −27.375 | 1.00 | 1.77250 | 49.6 |
| 23 | 39.674 | (variable) | | |
| image plane | ∞ | | | |

-continued

UNIT mm

VARIOUS DATA
Zoom Ratio 4.89

| | Wide-angle | Middle | Telephoto |
|---|---|---|---|
| Focal length | 49.72 | 153.03 | 242.97 |
| F-number | 4.50 | 6.80 | 7.10 |
| Half angle of view | 15.36 | 5.10 | 3.22 |
| Image height | 13.66 | 13.66 | 13.66 |
| Overall lens length | 124.87 | 174.19 | 189.86 |
| SK | 20.72 | 38.30 | 55.23 |
| d 3 | 2.02 | 51.34 | 67.00 |
| d 5 | 2.57 | 4.77 | 2.02 |
| d 8 | 21.59 | 3.53 | 1.92 |
| d11 | 2.66 | 21.80 | 25.14 |
| d14 | 17.81 | 8.32 | 1.62 |
| d19 | 22.52 | 11.16 | 1.95 |
| d23 | 20.72 | 38.30 | 55.23 |

LENS UNIT DATA

| Unit | Starting surface | Focal length |
|---|---|---|
| 1 | 1 | 140.25 |
| 2 | 4 | −85.58 |
| 3 | 6 | −169.39 |
| 4 | 9 | 70.24 |
| 5 | 12 | −73.37 |
| 6 | 15 | 34.12 |
| 7 | 20 | −33.63 |

TABLE 1

| | Example 1 | Example 2 | Example 3 | Example 4 | Example 5 |
|---|---|---|---|---|---|
| fw | 72.27 | 103.04 | 72.10 | 56.85 | 49.72 |
| f1 | 151.61 | 217.47 | 158.38 | 155.79 | 140.25 |
| f2 | −58.12 | −77.56 | −53.20 | −69.66 | −85.58 |
| fGp | 24.20 | 60.05 | 48.00 | 67.28 | 136.03 |
| fN | −295.37 | −76.45 | −337.91 | −40.09 | −33.63 |
| Skw | 14.44 | 14.98 | 14.23 | 21.47 | 20.72 |
| Dwp | 11.91 | 10.37 | 19.91 | 3.43 | 3.46 |
| Dtp | 20.01 | 24.58 | 30.94 | 11.93 | 25.94 |
| LDw | 137.50 | 219.06 | 163.87 | 123.69 | 124.87 |
| ndp | 1.8061 | 1.8503 | 1.7380 | 1.6730 | 1.8548 |
| vdp | 40.73 | 30.05 | 32.33 | 38.26 | 24.80 |
| θgFp | 0.5671 | 0.5979 | 0.5900 | 0.5757 | 0.6122 |
| vdL1Pave. | 75.89 | 94.66 | 88.10 | 81.54 | 81.54 |
| M1 | −55.62 | −100.00 | −61.02 | −65.03 | −64.98 |
| MLp | −10.59 | −34.96 | −7.59 | −22.01 | −20.22 |
| MLn | −2.49 | −20.75 | 3.44 | −13.51 | 2.25 |
| (1) | −0.0046 | −0.0015 | −0.0028 | −0.0017 | −0.0039 |
| (2) | 40.73 | 30.05 | 32.33 | 38.26 | 24.80 |
| (3) | 0.60 | 0.42 | 0.64 | 0.29 | 0.13 |
| (4) | 1.81 | 1.85 | 1.74 | 1.67 | 1.85 |
| (5) | 0.20 | 0.15 | 0.20 | 0.38 | 0.42 |
| (6) | 1.90 | 2.13 | 2.27 | 2.18 | 2.51 |
| (7) | 0.16 | 0.28 | 0.30 | 0.43 | 0.97 |
| (8) | −0.38 | −0.36 | −0.34 | −0.45 | −0.24 |
| (9) | −1.95 | −0.35 | −2.13 | −0.26 | −0.24 |
| (10) | 0.19 | 0.35 | 0.12 | 0.34 | 0.31 |
| (11) | 0.04 | 0.21 | 0.06 | 0.21 | 0.03 |
| (12) | 75.89 | 94.66 | 88.10 | 81.54 | 81.54 |

Figure 11:
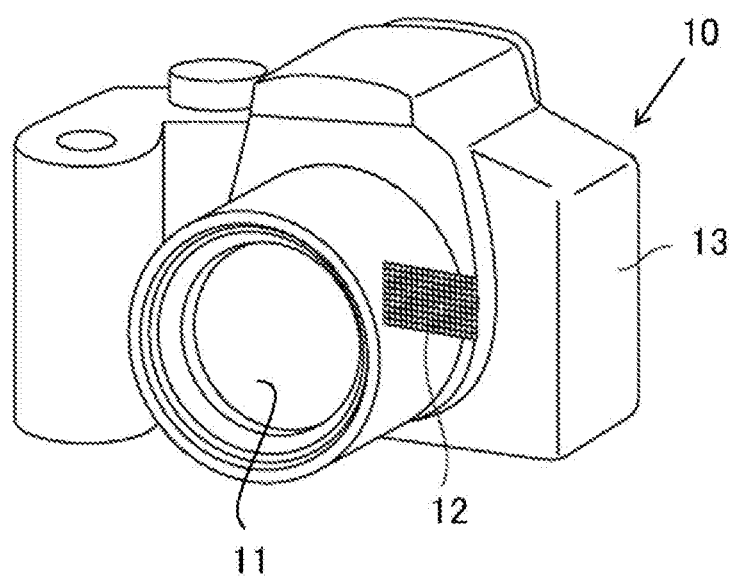
FIG. 11 illustrates an image pickup apparatus according to Example 6 of the present invention.

FIG. 11 illustrates a digital still camera (image pickup apparatus, optical apparatus) according to Example 6 using the zoom lens according to any of Examples 1 to 5 as an image pickup optical system. Reference numeral 10 denotes a camera body, and reference numeral 11 denotes an image pickup optical system. Reference numeral 12 denotes a solid-state image sensor (photoelectric conversion element), such as a CCD sensor and a CMOS sensor, housed in the camera body 10 and receives an optical image formed by the image pickup optical system 11 and photoelectrically converts it.

The camera body 10 may be a single-lens reflex camera having a quick return mirror or a mirrorless camera having no quick return mirror.

Use of the zoom lens according to any one of Examples 1 to 5 for an image pickup apparatus such as the digital still camera can provide an image pickup apparatus having a compact lens. If the zoom lens according to any of Examples 1 to 5 is mounted on an interchangeable lens (optical apparatus), a compact interchangeable lens can be obtained.

Each of the above examples can realize a zoom lens that has reduced longitudinal and lateral chromatic aberrations.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-138892, filed on Jul. 29, 2019, which is hereby incorporated by reference herein in its entirety.

What is claimed is:

1. A zoom lens comprising, in order from an object side to an image side,
a first lens unit having a positive refractive power;
a second lens unit having a negative refractive power; and
a rear group including a plurality of lens units,
wherein during zooming, each distance between adjacent lens units of the first, second and plurality of lens units change,
wherein the rear group includes an aperture stop and a negative lens unit disposed closest to an object side among at least one lens unit having a negative refractive power on the image side of the aperture stop,
wherein the rear group further includes a positive lens unit that is disposed between the second lens unit and the negative lens unit,
wherein the negative lens unit includes a positive lens, and
wherein the following conditions are satisfied:

$-0.1000 < \theta gFp - (-1.665 \times 10^{-7} \times vdp^3 + 5.213 \times 10^{-5} \times vdp^2 - 5.656 \times 10^{-3} \times vdp + 0.7268) < -0.0001$ $25 < vdp < 50$ $0.10 < Dwp/Dtp < 0.70$ $0 < |MLp/M1| \leq 0.35$ $1.0 < LDw/fw < 3.5$ where vdp is an Abbe number of the positive lens for the d-line, $\theta gFp$ is a partial dispersion ratio of the positive lens for the g-line and the F-line, Dwp is a distance on an optical axis at a wide-angle end from a position of the aperture stop to a vertex of the positive lens on the object side, Dtp is a distance on the optical axis at a telephoto end from a position of the aperture stop to the vertex of the positive lens on the object side, M1 is a moving amount of the first lens unit relative to an image plane during zooming from the wide-angle end to the telephoto end, MLp is a moving amount of the positive lens unit relative to the image plane during zooming from the wide-angle end to the telephoto end, LDw is an overall optical length of the zoom lens at the wide-angle end, and fw is a focal length of the zoom lens at the wide-angle end.

2. The zoom lens according to claim 1, wherein the following condition is satisfied:

$1.65 < ndp < 2.10$ where ndp is a refractive index of the positive lens for the d-line.

3. The zoom lens according to claim 1, wherein the following condition is satisfied:

$0.05 < SKw/fw < 0.50$ where SKw is a backfocus of the zoom lens at the wide-angle end, and fw is a focal length of the zoom lens at the wide-angle end.

4. The zoom lens according to claim 1, wherein the following condition is satisfied:

$0.10 < fGp/f1 < 1.20$ where fGp is a focal length of the positive lens, and f1 is a focal length of the first lens unit.

5. The zoom lens according to claim 1, wherein the following condition is satisfied:

$-0.80 < f2/f1 < -0.10$ where f1 is a focal length of the first lens unit, and f2 is a focal length of the second lens unit.

6. The zoom lens according to claim 1, wherein the following condition is satisfied:

$-3.00 < fRn/f1 < -0.10$ where f1 is a focal length of the first lens unit, and fRn is a focal length of a lens unit closest to an image side in the rear group.

7. The zoom lens according to claim 1, wherein the following condition is satisfied:

$0 < |MLn/M1| < 0.40$ where MLn is a moving amount of the negative lens unit relative to the image plane during zooming from the wide-angle end to the telephoto end, and M1 is a moving amount of the first lens unit relative to the image plane during zooming from the wide-angle end to the telephoto end.

8. The zoom lens according to claim 1, wherein the following condition is satisfied:

$65 < vdL1Pave. < 99$ where vdL1Pave. is an average value of Abbe numbers of at least two positive lenses included in the first lens unit for the d-line.

9. The zoom lens according to claim 1, wherein the positive lens unit and the aperture stop integrally move during zooming.

10. The zoom lens according to claim 1, wherein the rear group includes at least four lens units.

11. The zoom lens according to claim 10, wherein the plurality of lens units included in the rear group are five lens units, and
the five lens units are a third lens unit as the positive lens unit, a fourth lens unit as the negative lens unit, a fifth lens unit having a positive refractive power, a sixth lens unit having a negative refractive power, and a seventh lens unit having a negative refractive power, which are arranged in order from the object side to the image side.

12. The zoom lens according to claim 10, wherein the plurality of lens units included in the rear group are six lens units, and
the six lens units are a third lens unit as the positive lens unit, a fourth lens unit as the negative lens unit, a fifth lens unit having a positive refractive power, a sixth lens unit having a negative refractive power, a seventh lens unit having a positive refractive power, and an eighth lens unit having a negative refractive power, which are arranged in order from the object side to the image side.

13. The zoom lens according to claim 10, wherein the plurality of lens units included in the rear group are four lens units, and
the four lens units are a third lens unit as the positive lens, a fourth lens unit as the negative lens unit, a fifth lens unit having a positive refractive power, and a sixth lens unit having a negative refractive power, which are arranged in order from the object side to the image side.

14. The zoom lens according to claim 10, wherein the plurality of lens units included in the rear group are five lens units, and
the five lens units are a third lens unit having a negative refractive power, a fourth lens unit as the positive lens unit, a fifth lens unit as the negative lens unit, a sixth lens unit having a positive refractive power, and a seventh lens unit having a negative refractive power, which are arranged in order from the object side to the image side.

15. The zoom lens according to claim 1, wherein the following condition is satisfied:

$$30.05 \leq vdp < 50.$$

16. The zoom lens according to claim 1, wherein the following condition is satisfied:

$$-0.80 < f2/f1 \leq -0.34$$

where f1 is a focal length of the first lens unit, and f2 is a focal length of the second lens unit.

17. The zoom lens according to claim 1, wherein the following condition is satisfied:

$$-2.13 \leq fRn/f1 < -0.10$$

where f1 is a focal length of the first lens unit, and fRn is a focal length of a lens unit closest to an image side in the rear group.

18. The zoom lens according to claim 1, wherein the positive lens unit includes a biconvex lens.

19. The zoom lens according to claim 1, wherein a lens unit located closest to the image side of the zoom lens includes a negative lens and a positive lens disposed adjacent to the image side of the negative lens.

20. The zoom lens according to claim 1, wherein the first lens unit includes three lenses, the second lens unit includes three lenses and the negative lens unit includes two lenses.

21. An optical apparatus comprising a zoom lens and an image sensor configured to photoelectrically convert an optical image formed by the zoom lens,
wherein the zoom lens comprises, in order from an object side to an image side, a first lens unit having a positive refractive power, a second lens unit having a negative refractive power, and a rear group including a plurality of lens units,
wherein during zooming, each distance between adjacent lens units of the first, second and plurality of lens units change,
wherein the rear group includes an aperture stop and a negative lens unit disposed closest to an object side among at least one lens unit having a negative refractive power on the image side of the aperture stop,
wherein the rear group further includes a positive lens unit that is disposed between the second lens unit and the negative lens unit, wherein the negative lens unit includes a positive lens, and
wherein the following conditions are satisfied:

$$-0.1000 < \theta gFp - (-1.665 \times 10^{-7} \times vdp^3 + 5.213 \times 10^{-5} \times vdp^2 - 5.656 \times 10^{-3} \times vdp + 0.7268) < -0.0001$$

$$25 < vdp < 50$$

$$0.10 < Dwp/Dtp < 0.70$$

$$0 < |MLp/M1| \leq 0.35$$

$$1.0 < LDw/fw < 3.5$$

where vdp is an Abbe number of the positive lens for the d-line, θgFp is a partial dispersion ratio of the positive lens for the g-line and the F-line, Dwp is a distance on an optical axis at a wide-angle end from a position of the aperture stop to a vertex of the positive lens on the object side, Dtp is a distance on the optical axis at a telephoto end from a position of the aperture stop to the vertex of the positive lens on the object side, M1 is a moving amount of the first lens unit relative to an image plane during zooming from the wide-angle end to the telephoto end, MLp is a moving amount of the positive lens unit relative to the image plane during zooming from the wide-angle end to the telephoto end, LDw is an overall optical length of the zoom lens at the wide-angle end, and fw is a focal length of the zoom lens at the wide-angle end.

22. A zoom lens comprising, in order from an object side to an image side,
a first lens unit having a positive refractive power;
a second lens unit having a negative refractive power; and
a rear group including a plurality of lens units, wherein the plurality of lens units included in the rear group are five lens units,
wherein the plurality of lens units are a third lens unit as a positive lens unit, a fourth lens unit as a negative lens unit, a fifth lens unit having a positive refractive power, a sixth lens unit having a negative refractive power, and a seventh lens unit having a negative refractive power, which are arranged in order from the object side to the image side,
wherein during zooming, each distance between adjacent lens units of the first, second and plurality of lens units change,
wherein the rear group includes an aperture stop and the aperture stop is disposed on the object side from the third lens unit,
wherein the rear group includes a negative lens unit disposed closest to an object side among at least one lens unit having a negative refractive power on the image side of the aperture stop,
wherein the negative lens unit includes a positive lens, and
wherein the following conditions are satisfied:

$$-0.1000 < \theta gFp - (-1.665 \times 10^{-7} \times vdp^3 + 5.213 \times 10^{-5} \times vdp^2 - 5.656 \times 10^{-3} \times vdp + 0.7268) < -0.0001$$

$$25 < vdp < 50$$

$$0.10 < Dwp/Dtp < 0.70$$

$$0 < |MLp/M1| \leq 0.35$$

where vdp is an Abbe number of the positive lens for the d-line, θgFp is a partial dispersion ratio of the positive lens for the g-line and the F-line, Dwp is a distance on an optical axis at a wide-angle end from a position of the aperture stop to a vertex of the positive lens on the object side, Dtp is a distance on the optical axis at a telephoto end from a position of the aperture stop to the vertex of the positive lens on the object side, M1 is a moving amount of the first lens unit relative to an image plane during zooming from the wide-angle end to the telephoto end, and MLp is a moving amount of the positive lens unit relative to the image plane during zooming from the wide-angle end to the telephoto end.

* * * * *